United States Patent [19]

Ito

[11] Patent Number: 5,068,777
[45] Date of Patent: Nov. 26, 1991

[54] PULSE WIDTH MODULATION TYPE INVERTER HAVING TEMPERATURE COMPENSATION

[75] Inventor: Tomotaka Ito, Aichi, Japan

[73] Assignee: Mitsubishi Denki K.K., Tokyo, Japan

[21] Appl. No.: 559,796

[22] Filed: Jul. 30, 1990

[30] Foreign Application Priority Data

Aug. 23, 1989 [JP] Japan .................. 1-216479

[51] Int. Cl.$^5$ ........................ H02M 7/5395
[52] U.S. Cl. ........................ 363/97; 363/98; 363/41; 318/811; 388/811
[58] Field of Search ........ 363/41, 95, 97, 98, 363/131, 132; 318/811; 388/811, 934

[56] References Cited

U.S. PATENT DOCUMENTS 4,688,163  8/1987  Heinle .................... 363/96
4,691,269  9/1987  Yamane et al. ......... 363/98 X

FOREIGN PATENT DOCUMENTS 0089627   9/1983  European Pat. Off. .
0198204  10/1986  European Pat. Off. .
60-28798   2/1985  Japan .
62-92783   4/1987  Japan .

*Primary Examiner*—Steven L. Stephan
*Assistant Examiner*—Emanuel Todd Voeltz
*Attorney, Agent, or Firm*—Sughrue, Mion, Zinn, Macpeak & Seas

[57] ABSTRACT

A pulse-width modulation-type inverter operable at a variable frequency and amplitude and having the ability to modify carrier frequency on the basis of changes in temperature, output current and output frequency levels. The inverter operates in a high carrier frequency range which reduces the audio noise.

5 Claims, 10 Drawing Sheets

PULSE WIDTH MODULATION TYPE INVERTER HAVING TEMPERATURE COMPENSATION

BACKGROUND OF THE INVENTION

1. Field Of The Invention

The present invention relates to a pulse width modulation type inverter for delivering an A.C. current at variable voltage and variable frequency. More particularly, the present invention is concerned with the control of the pulse width modulation signal (referred to as a "PWM" signal, hereinafter) in an inverter using a high carrier frequency.

2. Description Of The Prior Art

Figure 10:
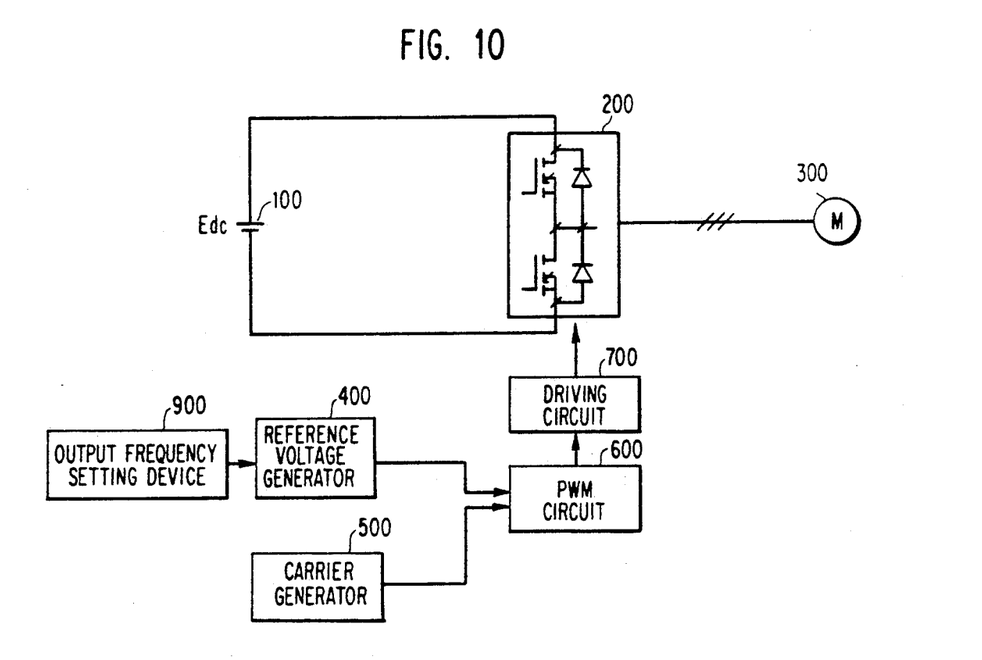
FIG. 10 is a block diagram of a conventional inverter apparatus.

FIG. 10 is an illustration of the arrangement of a conventional PWM inverter. Referring to the drawings, the known PWM inverter includes a D.C. power supply 100 and an inversion converter 200 composed of a controllable element and a pair of inverse parallel-connected diodes. The inversion converter is capable of converting a D.C. current into an A.C. current of variable voltage and variable frequency, which is useable to drive an electric motor 300, or similar device. A reference voltage generator 400 generates a reference voltage waveform, which is used as a reference for the output frequency and output voltage. In practice, the waveform of the reference voltage has the optimum shape for operating the motor, but such a shaped waveform cannot be obtained with adequate power where commercial electrical power is not available. Thus, a carrier waveform having adequate power is mixed with the reference wave and results in a pulsed waveform having the same area as the reference voltage wave, adequate to drive the motor or like device. The reference waveform is modified in response to the input from an output frequency setting device 900 that is setable by a user. A suitable carrier generator 500 will form a carrier signal, for example, a triangular waveform, at a frequency $f_c$. A PWM circuit 600 is operative in response to the signals from the reference voltage generator 400 and the carrier generator 500 to produce a control signal for the controllable element of the inversion converter 200. A driving circuit 700 will drive the controllable element of the inversion converter 200 in response to the signal from the PWM circuit 600 and an output frequency setting device 900.

Figure 11:
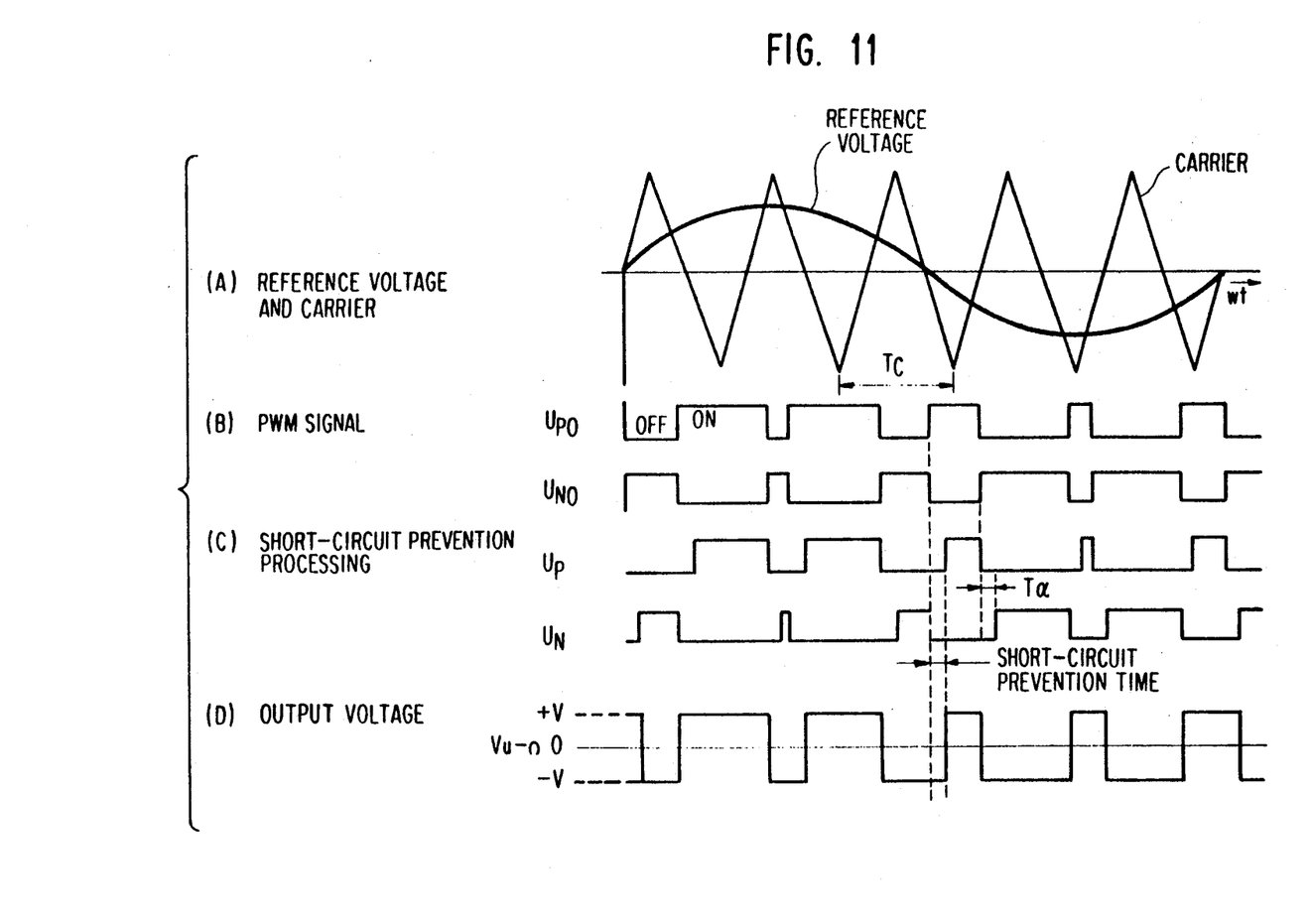

The operation of this known inverter will be describe with reference to FIG. 11, which illustrates several waveforms that occur during a typical PWM operation. It should be noted that the illustration is in regard to only one phase, specifically the "U phase", of the three phases U, V and W relevant to the actual inverter operation in producing 3-phase A.C. power for operating a motor or like device. Referring to FIG. 11(a), the triangular waveform output of the carrier generator 500 and the sinusoidal waveform output by the reference voltage generator 400 are shown superimposed in the same time frame. The superimposed waveforms illustrate a comparison between the reference voltage, which is used as a reference for the output voltage and the output frequency of the inverter, and the signal for modulating the reference voltage, e.g., the triangular carrier waveform. Waveforms in FIG. 11(b) are generated on the basis of the points of the waveforms of FIG. 11(a) where the reference voltage waveform and the carrier cross. One of the waveforms in FIG. 11(b) is a PWM signal $U_{po}$. This signal is generated for the upper side of the U phase and the signal is ON in the period in which the reference voltage is higher than the carrier voltage and OFF in the period in which the reference voltage is lower than that of the carrier. The other waveform in FIG. 11(b) is a PWM signal $U_{NO}$. This signal is generated for the lower side of the U phase and is obtained as the inversion of the signal $U_{PO}$. The controllable element is actually driven by the PWM signals Up and Un, as seen in FIG. 11(c), which signals are formed from waveforms $U_{PO}$ and $U_{NO}$ as subjected to a short circuit prevention process which delays the timing of the ON pulse by a time duration $T_d$. As a result of this delay, the pulse-width modulated output voltage obtained as the U phase output is shown in FIG. 11(d). Similar outputs are obtained for the V and W phases.

Referring again to FIG. 10, the reference voltage waveform shown in FIG. 11(a), which provides a reference for output frequency and output voltage, is delivered by the reference voltage waveform generator 400. The triangular carrier wave shown in FIG. 11(a) is generated by the carrier generator 500. The PWM circuit 600 responds to the waveforms of FIG. 11(a) and generates a PWM signal as shown in FIG. 11(c). The driving circuit 700 amplifies the output of circuit 600 and drives the controllable element of the inversion converter 200 accordingly. Since the driving signal will vary with changes in the reference voltage waveform, an A.C. current may be obtained from the inverter with a variable voltage and a variable frequency.

When an electric motor is driven with this type of PWM waveform, higher harmonics, in the audible range, are generated due to the carrier frequency. These audible signals will increase the level of noise in a work environment. One countermeasure for averting this problem is to increase the carrier frequency to the upper limit of the human audible frequency range (i.e., 15 KHz) or higher. The level of noise will progressively decrease as the carrier frequency is increased. In fact, when the carrier frequency is within the range between 10 KHz and 15 KHz, the noise frequency approaches the upper limit of the audible frequency range and the noise level is lowered. When the carrier frequency is increased beyond 20 Khz the audible frequency range is exceeded so that the higher harmonics are not detectable by human ears. As a result, the noise level is reduced almost to the level produced when the load is driven by commercial electrical power.

In order to achieve a high carrier frequency accompanied by low noise, a high-speed switching element such as a power MOSFET, IGBT or the like, operable at a frequency between 10–20 Khz, may be used. The disadvantage of such design is that the switching is inevitably accompanied by a significant amount of power loss. More specifically, the loss P generated by a controllable element accompanied by inverse-parallel diodes, is given by the following formula:

$$\begin{aligned} P &= P_{ON} + P_{SW} \\ &= \text{ordinary loss} + \text{switching loss} \\ &= P_{ON}(I) + P_{SW}(f_c, I) \end{aligned} \quad (1)$$

The "ordinary loss" is the product of the current flowing during the ON time and the voltage drop, while the "switching loss" is the product of voltage and current at the time that the controllable element is turned ON and OFF. In simplified form, as indicated in equation (1), the total ordinary loss $P_{ON}$ is merely a function of current level (I), while the total switching loss $P_{SW}$ is a function of current level (I) and the carrier frequency ($f_c$) which controls the switching of the element.

The switching loss $P_{SW}$ is increased as the carrier frequency $f_c$ is increased. Also, the ratio of loss $P_{ON}$: $P_{SW}$ is large when the current is near the level of the rated current of the inverter. When inverter operation results in a relatively high switching loss, i.e., high $f_c$ and high current, since proper thermal design of the switching element requires that its junction temperature be maintained below a given level, there is a significant cooling requirement. Thus, operation of the inverter at a high carrier frequency will reduce audible noise, but will require both an increase in the cooling capability and the size of the inverter.

The noise produced poses a serious problem when an inverter-driven electric motor operates at low speed. At low motor speeds, the noise generated by the load driven by the motor is relatively low and the motor noise tends to be dominant. At higher motor speeds, the noise generated by the load driven by the motor is increased so that the higher harmonic sounds produced by the electric motor are not dominant and their effect is not critical. Nevertheless, in the conventional inverter, when the speed of the motor is increased, $f_c$ is maintained high so that the loss is increased due to high switching losses. In order to satisfy the thermal requirements of the switching element, the conventional inverter must be designed to maintain the temperature of the switching element below a maximum allowable temperature. Clearly, when the ambient temperature is low, the inverter can operate safely even when $f_c$ is kept high after an increase in the load. However, when the ambient temperature begins to rise, the most effective parameter available to contain the temperature below the maximum for the switching element is the carrier frequency $f_c$. If carrier frequency $f_c$ is reduced to reduce the temperature rise due to switching power losses, however, it is difficult to effectively suppress the generation of audible noise.

The present invention is intended to solve the above-described problems of the prior art. Thus, an object of the present invention is to provide an inverter apparatus which can operate with a lowered level of audible noise and which can compensate for increases in loss without requiring the size of the inverter to be increased or special cooling to be applied.

A further object of the present invention is to control the carrier frequency in accordance with the inverter output frequency or the temperature of the controllable elements, or output current, so that the generation of noise is suppressed and the loss of power is reduced.

SUMMARY OF THE INVENTION

In the inverter apparatus of the present invention, the carrier frequency is variable within a range between an upper limit carrier frequency $f_c$max, which is determined by the acceptable loss and the response time of the inverter, and a lower limit carrier frequency $f_c$min, which is determined by the acceptable noise characteristic and distortion of the output current. The carrier frequency is controlled in accordance with the temperature of the controllable element of the inverter apparatus in such a manner that the carrier frequency is decreased and increased, respectively, as the detected temperature of the controllable element is increased and decreased. Alternatively, the carrier frequency is controlled in accordance with the output frequency of the inverter apparatus in such a manner that the carrier frequency is decreased and increased, respectively, as the inverter output frequency is increased and decreased. The carrier frequency may also be controlled in accordance with the output current of the inverter apparatus in such a manner that the carrier frequency is decreased and increased, respectively, as the inverter output current is increased and decreased.

The carrier generator in the inverter apparatus of the present invention determines the carrier frequency in accordance with the temperature of the controllable element of the inverter or the output frequency or output current of the inverter. More specifically, the carrier frequency is increased when the detected temperature or the speed of the electric motor is low or the inverter output current is small, to thereby suppress noise generation, whereas when the detected temperature or the motor speed is increased or the inverter output current is large, the carrier frequency is decreased so as to reduce loss generated in the controllable element.

BRIEF DESCRIPTION OF THE DRAWINGS

FIGS. 11(a)–11(d) illustrate waveforms showing the relationship between a reference voltage, a carrier and the PWM signal in the conventional inverter apparatus.

DESCRIPTION OF THE PREFERRED EMBODIMENTS

The following is a description of alternative embodiments of the present invention with reference to the accompanying drawings.

Figure 1:
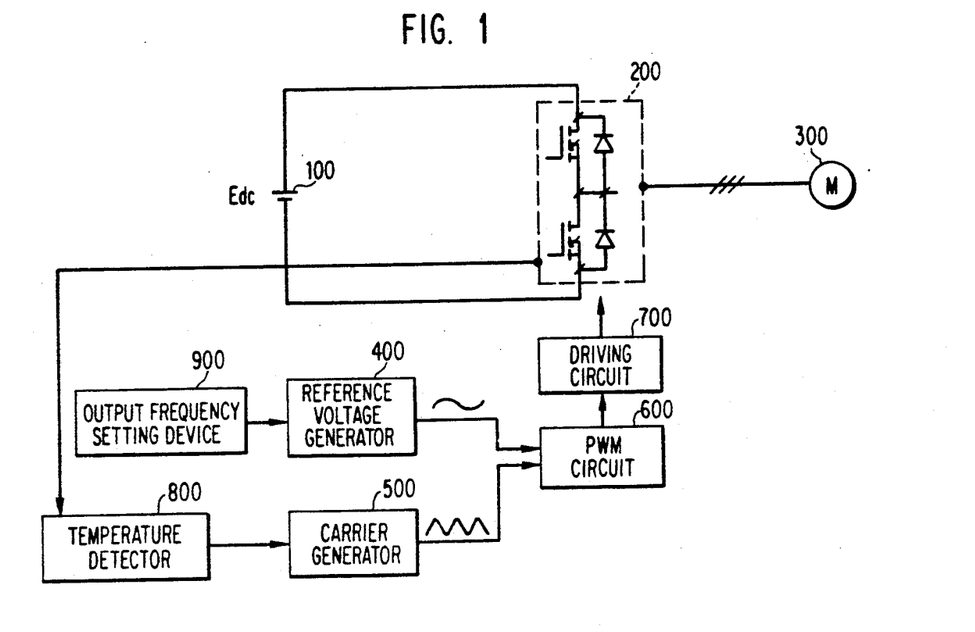
FIG. 1 is a block diagram of an inverter apparatus which is an embodiment of the present invention.
Figure 3:
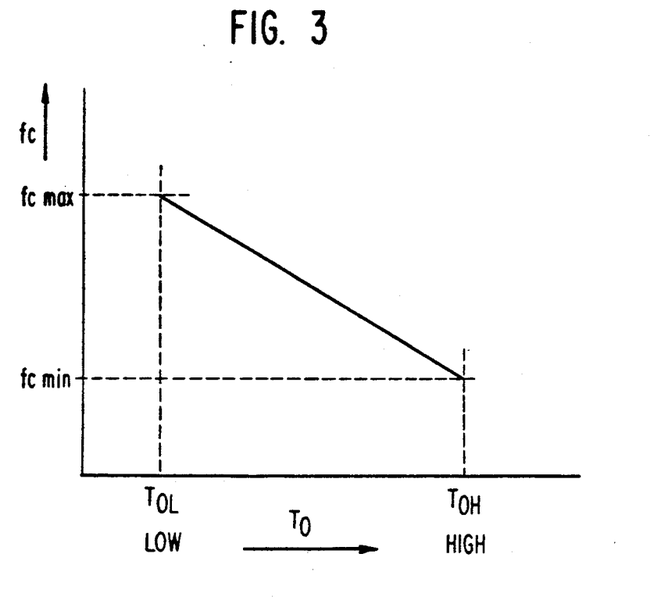
FIG. 3 is an illustration of the relationship between the temperature of the controllable element of FIG. 1 and the carrier frequency.

Referring to FIG. 1, numerals 100, 200, 300, 400, 600, 700 and 900 indicate elements which are the same or similar to those denoted by the same numerals in FIG. 10, referring to the known inverter apparatus. Numeral 800 denotes a temperature detector for detecting the temperature of the controllable element and numeral 500 denotes a carrier generator that produces a signal with a frequency $f_c$ that is variable in response to the output of the temperature detector 800. The carrier frequency $f_c$ is controlled in a linear manner as shown in FIG. 3, within a range between predetermined frequency limits $f_c$max and $f_c$min, in accordance with changes in temperature To, as represented by the output from the temperature detector 800. As a result, a carrier, for example, a triangular waveform, is delivered to the PWM circuit at the controlled carrier frequency $f_c$.

Figure 2:
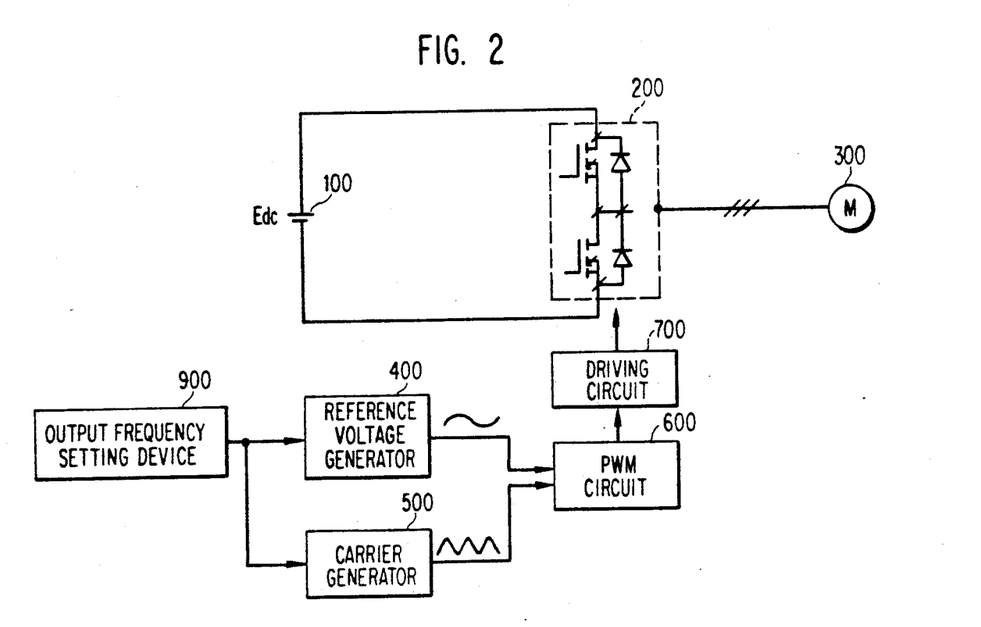
FIG. 2 is a block diagram of an inverter apparatus which is another embodiment of the present invention.

FIG. 2 shows another embodiment of the present invention. The elements of this embodiment are substantially the same as that shown in FIG. 1 except that the temperature detector is removed and carrier generator 500 receives instead an input from the inverter output frequency setting device 900. The carrier frequency $f_c$ is controlled in a linear manner shown in FIG. 4, within a range between predetermined frequency limits $f_c$max and $f_c$min, in accordance with changes in output frequency $f_o$. The output frequency is set by an operator (i.e. at 30 Hz, 40 Hz, 60 Hz etc.) between an upper limit $f_{oH}$ and lower limit $f_{oL}$ and the carrier frequency $f_c$ is determined on the basis of an inverse relationship, falling between lower limit $f_c$min and upper limit $f_c$max, typically 15 Khz to 20 Khz.

Figure 13:
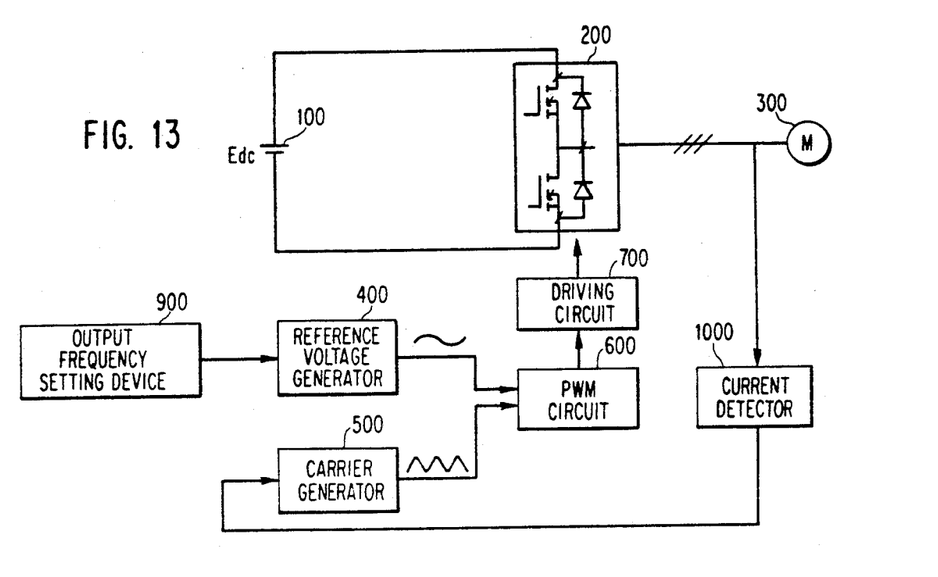
FIG. 13 is a block diagram of an inverter apparatus which is yet another embodiment of the present invention.
Figure 14:
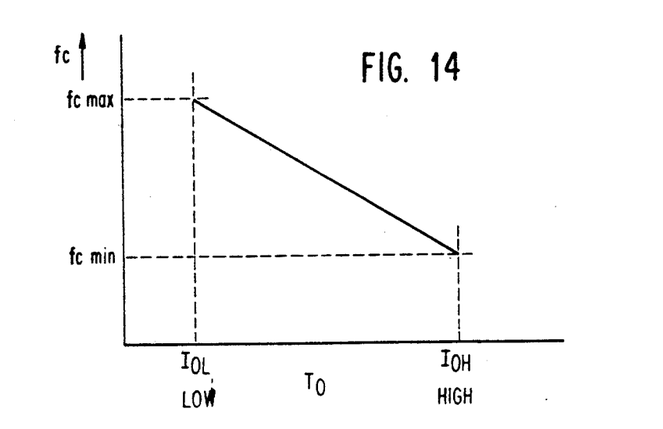
FIG. 14 is an illustration of the relationship between the output frequency in FIG. 13 and the carrier frequency.

FIG. 13 shows a third embodiment in which the carrier frequency is controlled in accordance with the output from a current detector 1000, capable of detecting the load current on the inverter, within a range of low current $I_{oL}$ and high current $I_{oH}$. The carrier frequency has an inverse linear relationship with the current within a range between predetermined frequencies $f_c$max and $f_c$min, (typically 15 Khz –20 Khz) in a manner shown in FIG. 14. The current detector 1000 may be a DCCT current detector which makes use of a Hall element. Although in FIG. 13 the current detector 1000 is provided at the output side of the inverter, this is only illustrative and the current detector 1000 may be provided at any suitable portion where it can detect a current corresponding to the output current of the inverter.

Figure 4:
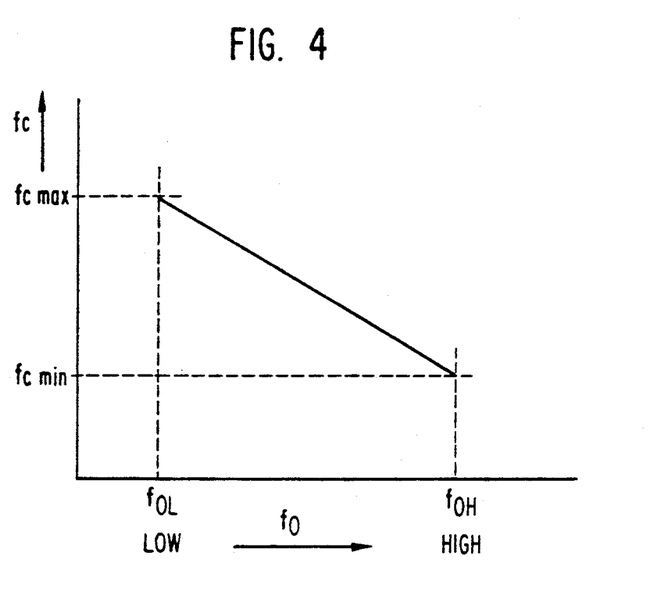
FIG. 4 is an illustration of the relationship between the output frequency of FIG. 2 and the carrier frequency.

A detailed description will be given of the change in the carrier frequency $f_c$min to $f_c$max in response to changes in the detection temperature $T_o$, output frequency $f_o$ and the load current $I_o$ as shown in FIGS. 3, 4 and 13.

Initially, it will be recalled that the motor which is the load on the inverter generates a higher-harmonic noise attributable to the carrier frequency $f_c$. The effect of the noise can be avoided by increasing the carrier frequency $f_c$ to a level higher than the range of audible frequencies. Such a countermeasure, however, causes a significant increase in the loss in the controllable element, causing a risk that the temperature $T_o$ of the controllable element will exceed the allowable upper limit value.

The temperature $T_o$ of the controllable element is represented by:

$$T_o = T_a + \Delta T \qquad (2)$$

where, Ta represents the temperature of the ambient air around the inverter, while $\Delta T$ represents the temperature rise of the controllable element itself.

Furthermore, the temperature rise $\Delta T$ is represented by:

$$\Delta T = P \times R_{th} \qquad (3)$$

where, P represents the loss of the controllable element, and $R_{th}$ represents the thermal resistance of the controllable element including its cooling means.

As explained before, the loss P generated in the controllable element can be expressed in terms of the steady loss $P_{ON}$ and switching loss $P_{SW}$, wherein the steady loss $P_{ON}$ can be given as a function of the output current $I_O$, while the switching loss $P_{SW}$ is a function of the output current $I_O$ and the carrier frequency $f_c$. The loss P is changed in relation to the power $P_L$ supplied by the inverter to the load namely, the smaller the power $P_L$, the smaller the loss P. In general, one aim of the use of an inverter of the type described resides in the reduction of energy consumption by reducing the power $P_L$ supplied to the load by reducing the output frequency $f_o$ of the inverter. In consequence, it is possible to reduce the loss P by reducing the output frequency $f_o$ and the loss P can be expressed as a function of the output frequency $f_o$.

To sum up, the temperature To of the controllable element is expressed as follows:

$$T_O = T_a + \{P_{ON}(I_O, f_o) + P_{SW}(I_O, f_c)\} \times R_{th} \qquad (4)$$

As will be understood from this formula, the temperature $T_o$ of the controllable element can be determined when the ambient air temperature $T_a$ around the inverter, output current $I_O$, output frequency $f_o$ and the carrier frequency $f_c$ are given. The parameters other than the carrier frequency $f_c$ are determined by the conditions and environment under which the inverter is used and, hence, cannot be controlled by the inverter itself. The temperature $T_O$ of the controllable element may rise as a result of one or both of the loss generated in the controllable element due to a change in the conditions or environment under which the inverter is used and a rise in the ambient air temperature around the inverter. According to the invention, when the temperature $T_O$ approaches the maximum allowable temperature $T_R$ of the controllable element, the carrier frequency $f_c$ is lowered so as to maintain the temperature $T_O$ of the controllable element below the maximum allowable temperature $T_R$. FIG. 3 qualitatively illustrates the relationship between frequency and temperature and shows that frequency must be reduced to reduce the temperature.

The control according to the relationships shown in FIGS. 4 and 13, which rely upon the output frequency $f_o$ and the output current $I_O$, respectively, in fact employ control of the carrier frequency in accordance with the temperature $T_O$ of the controllable element. In these methods, temperature is detected indirectly through detection of the output frequency $f_o$ and the output current $I_O$. However, since there is no information concerning the ambient air temperature $T_a$, the control is not as accurate when compared with the method which relies upon the direct detection of the temperature $T_O$ of the controllable element. Such systems can be constructed with reduced cost because no temperature sensor is required.

Figure 5:
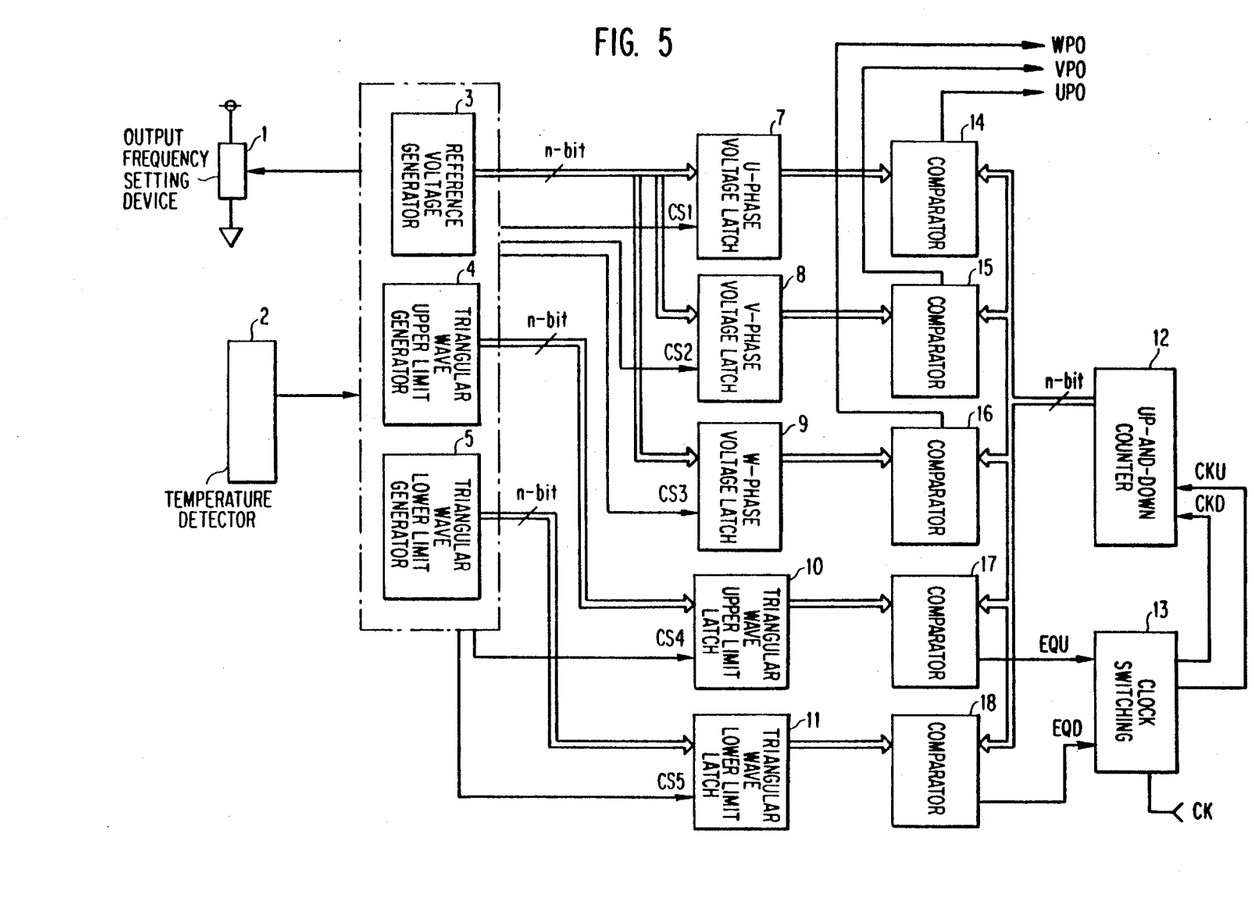
FIG. 5 is a block diagram of a circuit used in the present invention for changing the carrier frequency in accordance with the output frequency or the temperature of the controllable element.

In FIG. 5, the details of carrier generator 500 are shown. In the illustration is a reference voltage generator 3, whose output approximates a sine wave by, for example, quantization of an input analog signal with n-bit digital processing. Reference numeral 4 denotes a device for generating the upper limit value of a triangular wave carrier signal, having a controllable upper limit value, while numeral 5 denotes a device for generating the lower limit value of the triangular carrier signal. The devices 3 to 5 can be realized by the computing functions of a microcomputer 6, which may output respective voltage values in digital form. The microcomputer 6 may be a 16-bit microcomputer such as INTEL 8086 CPU, having a 16 bit data bus and incorporating an A/D converter. The voltage data derived from the microcomputer 6 are latched by flip-flops 7–9. The inverter of this embodiment is assumed to output 3-phase A.C. power so that flip-flops 7–9 latch voltages applicable to each of the U, V and W phases. Flip-flops 10 and 11 are connected to the microcomputer 6 for latching the upper and lower limit value data outputs from the limit generating elements 4 and 5, respectively. In FIG. 5, CS1, CS2, CS3, CS4 and CS5 represent control signals from the microcomputer 6 to the flip-flops 7 to 11.

Figure 12:
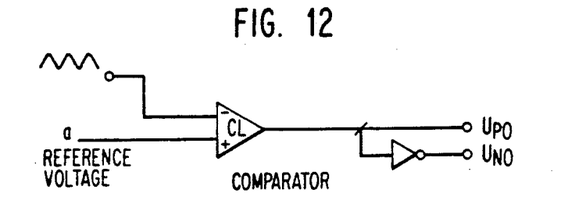
FIG. 12 is a simplified operational illustration of the conventional inverter apparatus.

An n-bit up-and-down counter 12 is used for quantizing the triangular waveform generated by the carrier signal generator and outputting the quantized value. The triangular waveform is generated by counter 13, which repeats an up-count CKU and a down-count CKD in response to a clock input signal CK. Numerals 14 to 18 denote n-bit digital signal comparators. More specifically, the comparator 14 compares the n-bit U-phase voltage data from flip-flop 7 with the n-bit triangular wave data output by counter 12 and produces an output signal $UP_o$ in accordance with the result of the comparison. Similarly, the comparators 15 and 16 produce outputs $VP_o$ and $WP_o$, respectively, in accordance with the results of comparisons between the V- and W-phase voltage data from flip-flops 8 and 9 and the triangular wave data output by counter 12. Comparator 17 is operative to compare the triangular wave data produced by the up-and-down counter 12 with the triangular wave upper limit data derived from the flip-flop 10 and delivers an output signal $EQ_u$ to the clock switching circuit 13. Comparator 18, which is similar to the comparator 17, compares the triangular wave data from counter 12 with the triangular wave lower limit data from flip-flop 11. The output signals from the digital comparators 14, 15 and 16 which serve as signals for driving the switching elements of the U-, V- and W-phase are delivered to inversion circuits and short-circuit prevention circuits (not shown) in the manner illustrated for one of the phase signals in FIG. 12.

An output frequency setting device 1 and a temperature detector 2 are also seen in FIG. 5, connected to microcomputer 6. The output frequency setting device 1 may output a signal in the form of voltage or current, based upon the operator's setting of a variable control contact in the device. In the figure, the output frequency setting device 1 operates with a voltage signal. The temperature detector 2 for detecting the temperature of a switching element, e.g., a MOSFET or IGBT, outputs an analog signal, e.g., a voltage signal. In a simplified form, the temperature detector may be a switch which is turned "on" and "off" when the temperature changes across a reference temperature.

In operation, the output signal from the output frequency setting device 1 or the temperature detector 2 is delivered to the input port of the microcomputer 6. When a voltage signal is input from the output frequency setting device 1, a reference voltage corresponding to the output frequency is output from the microcomputer 6. Simultaneously, the triangular wave upper and lower limit values, which provide turning points of the triangular wave, are output from the microcomputer 6. The output signal from the output frequency setting device 1 or the temperature detector 2 is delivered to the input port of the microcomputer 6 which converts the thus input analog signal into a digital signal and calculates the upper and lower limit values of the reference voltage triangular wave. It is assumed here that the level of the output from the output frequency setting device 1 or temperature detection device 2 is constant.

Figure 6:
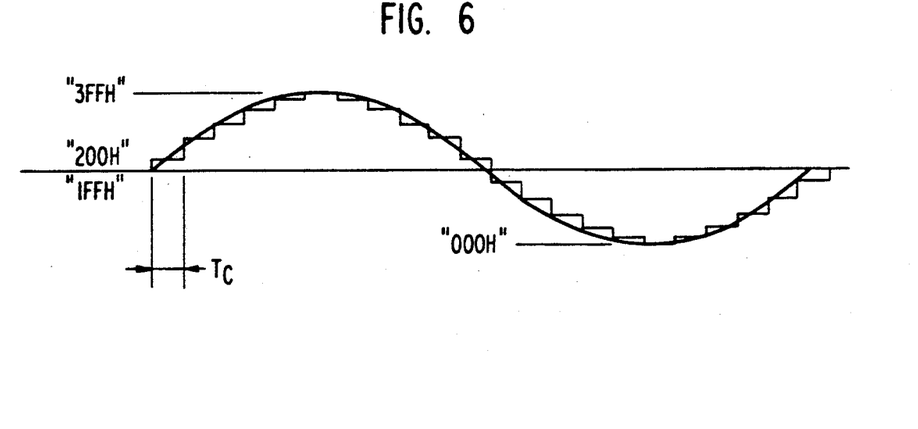
FIGS. 6 and 7 are waveform charts showing the reference voltage and the carrier frequency in the inverter apparatus of the present invention.

The microcomputer 6 can output a sine wave reference signal, quantized and approximated by an n-bit digital amount, as shown in FIG. 6. The duration of each quantization step, having a size Tc as shown in FIG. 6, is established by the computing time of the microcomputer. Needless to say, the degree of approximation of the sine wave is increased as the time Tc is shortened and as the number n of the bits used in the quantization process is increased. Assuming that the number n is 10 (n=10), a wave approximating a sine waveform is obtained which has an upper limit value of 3FFH and a lower limit value of 000H in terms of hexadecimal notation. The imaginary center of the amplitude of this sine wave resides between 200H and 1FFH in terms of hexadecimal notation and the output sine wave changes its amplitude about this center of amplitude. Thus, when the output frequency setting device 1 sets the output frequency of the inverter apparatus to a high level, the sine waveform amplitude is increased. By the same token, when the output frequency is set to a low level, the amplitude is decreased. The voltage signals computed and output by the microcomputer 6 are latched by flip-flops 7, 8 and 9, in correspondence with the voltages of the three phases U, V and W, respectively. These voltage data are set and latched at 120° intervals in terms of electric angle. Since in the preferred embodiment the voltage data would be set through the 16-bit data bus of the microcomputer 6, when the size of the voltage data of each of U, V and W phases exceeds 5 bits, the voltage data cannot be set and latched in one operation, and the setting and latching has to be done in a plurality of operations. In such a case, the comparison of these voltage data with the triangular wave performed by the comparators is impeded due to the time difference existing between the voltage data for the three different phases. It is therefore necessary to provide an additional stage of flip-flops so as to enable the provision of voltage data for the U, V and W phases simultaneously.

Figure 7:
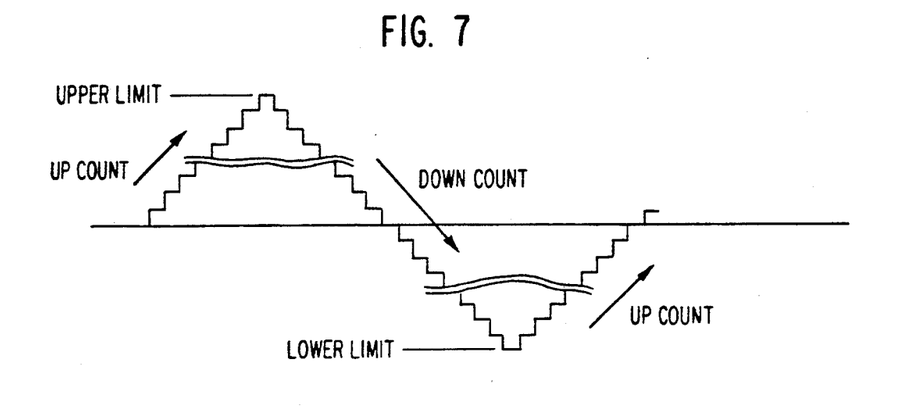

Referring to FIG. 7 and again to FIG. 5, the triangular wave upper and lower limit value data output from the microcomputer 6, as a result of functions 4 and 5, respectively, provide the turning points of the triangular wave generated by the triangular wave generator 12. The triangular wave upper limit value is latched by the flip-flop 10 and delivered to the comparator 17. Similarly, the triangular wave lower limit value is latched by the flip-flop 11 and delivered to the comparator 18. As previously noted, the triangular wave generator 12 is an up-and-down counter which is controlled by up-counting clock CKU and down-counting clock CKD, and its current count is output simultaneously to comparators 14-18. If the up-and-down counter 12 is in up-counting mode, it continues to count up in response to input clock signals CKU as seen by the ascending step waveform of FIG. 7. However, when the triangular wave data constituted by n bits has become equal to the n-bit triangular wave upper limit value during the up-counting by the counter 12, the comparator 17 produces a coincidence signal EQU. In response to this signal EQU, the clock switching circuit 13 operates to set the up-count clock CKU in a non-active state and set the down-count clock CKD in an active state, so that the counter 12 is switched from up-counting mode to down-counting mode. When in the down-counting mode, the counter 12 counts down from its value at the turning point in stepped response to clock input CKD, as also seen in FIG. 7. When the triangular wave data becomes equal to the n-bit triangular wave lower limit data during the down-counting operation, the comparator circuit 18 delivers a coincidence signal EQD. In response to this signal, the clock switching circuit 13 operates so that the clock CKD and the clock CKU are switched into inactive and active states, respectively. The above-described operation is continually repeated so that a triangular wave signal is formed which has crests at the level of the triangular wave upper limit value and valleys at the level of the triangular wave lower limit value.

Figure 8:
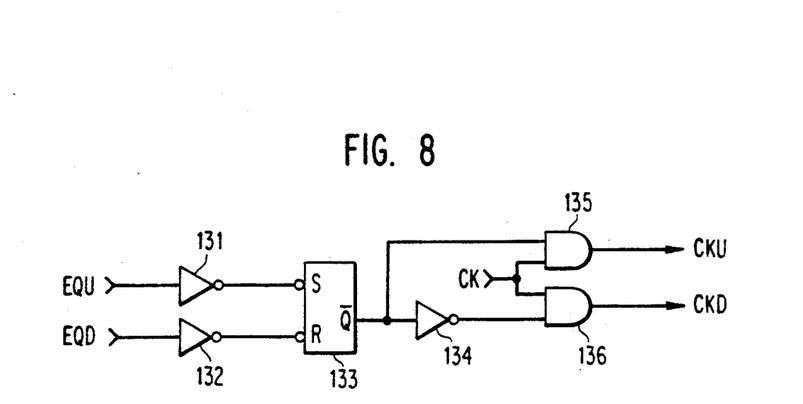
FIG. 8 is an illustration of a clock switching circuit used in the present invention.

FIG. 8 shows an example of the construction of the clock switching circuit used in counter 13. The upper limit coincidence signal EQU and the lower limit coincidence signal EQD are amplified by amplifiers 131 and 132, respectively, and are input to set-reset type flip-flop 133. The $\overline{Q}$ output of the flip-flop is divided into two signals, one of which is inverted by inverter amplifier 134. A pair of logic gates 135 and 136 receive clock signal CK and each gate receives one of the $\overline{Q}$ signal and a signal which is the inversion of $\overline{Q}$. On the basis of these inputs, the gates produce the clocks CKU and CKD. In operation, when the EQU signal is input, the flip-flop is set and the state Q="L" is obtained. Accordingly, the clock CKU is placed in an inactive state while the clock CKD is placed in an active state.

The frequency of the triangular wave is determined by the set values of the upper and lower limits and the frequency $f_{ck}$ of the clock CK with which frequency the up-and-down counter 12 performs its counting function. The following formula determines the frequency:

$$f_c = \frac{f_{ck}}{(\text{upper limit} - \text{lower limit}) \times 2} \quad (5)$$

If it is assumed that the triangular wave data is 10-bit data with upper and lower limit values of 3FFH and 000H in terms of hexadecimal notation, while the frequency $f_{ck}$ is 20 Mhz, the frequency of the triangular wave, i.e., the carrier frequency $f_c$, is calculated from formula (5) as follows:

$$\begin{aligned} f_c &= \frac{f_{ck}}{(\text{"3 FFH"} - \text{"000H"}) \times 2} \\ &= \frac{20 \times 10^6}{(1024 - 0) \times 2} \\ &= 9.8 \times 10^3 \text{ (Hz)} \end{aligned} \quad (6)$$

Once the size and frequency of the triangular wave is set, its value output from counter 13 is compared with the reference voltage data of the U, V and W phases by the aforementioned comparators 14, 15 and 16, whereby a PWM signal is obtained in accordance with the principle explained previously in connection with FIGS. 11(a) and 11(b).

The carrier frequency may be changed in accordance with the information from the output frequency setting device 1. As explained above, the carrier frequency $f_c$, i.e., the frequency of the triangular wave, is determined by adjusting the set values of the upper and lower limits and the clock frequency $f_{ck}$. Thus, the carrier frequency $f_c$ can be controlled by varying the upper and lower limit values provided that the clock frequency $f_{ck}$ is constant. For instance, if the upper and lower limits are set to 2 FFH and 100H, respectively, the carrier frequency $f_c$ is calculated from formula (1) as follows:

$$\begin{aligned} f_c &= \frac{20 \times 10^6}{(768 - 256) \times 2} \\ &= 19.5 \times 10^3 \text{ (Hz)} \end{aligned} \quad (7)$$

Clearly, it is thus possible to obtain a carrier frequency $f_c$ which is twice as large as the carrier frequency $f_c$ determined by formula (6).

Representing the difference between the upper limit value and the lower limit value of the triangular wave by k, the carrier frequency $f_c$ is determined by the following formula:

$$f_c = f_{ck}/2k \quad (8)$$

From the formula, it clearly is possible to increase the carrier frequency $f_c$ by reducing the difference k between the upper and lower limit values. It is therefore possible to control the carrier frequency $f_c$ in relation to the output frequency of the inverter in such a manner that the carrier frequency $f_c$ is decreased and increased, respectively, in response to an increase and decrease in the inverter output frequency, by setting the output from the microcomputer 6 in such a manner as to decrease and increase the value of the difference k in response to increases and decreases in the inverter output frequency. The control of the carrier frequency $f_c$ in response to the detected temperature can be executed in the same manner. Namely, the temperature value input from temperature detector 1 can be used by microcomputer 6 to adjust the value k by adjusting either or both upper and lower limit values of the triangular waveform.

Figure 9:
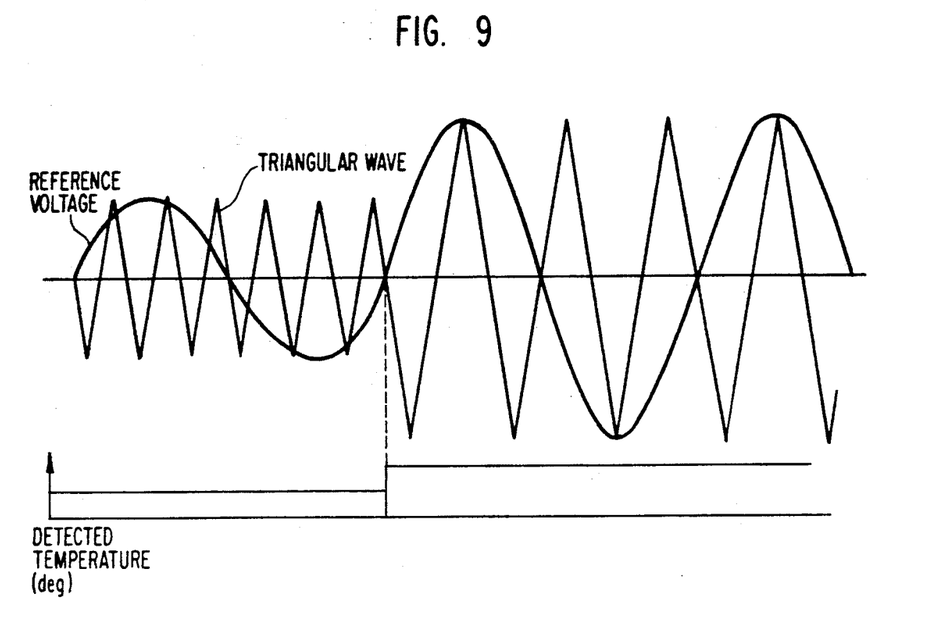
FIG. 9 is a chart showing the relationship between the temperature of the controllable element and the output voltage and the carrier frequency in the present invention.

When the carrier frequency $f_c$ is not changed, the amplitude of the triangular wave is maintained constant so that the amplitude of the reference voltage is changed in proportion to the frequency of the reference voltage and delivered as the output from the inverter apparatus. Needless to say, the relationship between the voltage and the frequency of the A.C. power is determined by the amplitude of the triangular wave, the amplitude of the reference voltage and the frequency of the reference voltage. In this embodiment, the amplitude of the triangular wave is changed in accordance with a change in the carrier frequency $f_c$ so that the amplitude of the reference voltage is also changed in order to maintain a constant relationship between the voltage and frequency of the output A.C. power of the inverter apparatus. This can be achieved by changing the reference voltage generated by the reference voltage generator in accordance with the upper and lower limit values of the triangular wave, by the microcomputer 6. Such control can be performed without difficulty by the computing function of the microcomputer 6. FIG. 9 shows the qualitative changes in the triangular waveform and the reference voltage waveform of one phase as observed when the carrier frequency $f_c$ is decreased as a result of a rise in the detected element temperature when the output A.C. power of the inverter apparatus is maintained constant. Clearly, it is possible to easily control the carrier frequency $f_c$ by the above-described circuit arrangement.

As to the practical construction of the circuits shown by the block diagram, each of the flip-flops 7 to 11 can be realized by D-type flip-flops 74HC74, each of the comparators 14 to 18 can be realized by a magnitude comparator 74HC85, and the up-and-down counter 12 can be realized by an up-and-down binary counter 74HC193. A change in the frequency of the triangular wave without being accompanied by a change in the amplitude can be realized simply by changing the clock frequency $f_{ck}$. While the temperature of the controllable elements is detected directly in the described embodiments, it may be more practical to detect the temperature of the surface of the cooling construction of the controllable elements or a part thereof, and to detect the ambient temperature of the inverter. The automatic control of carrier frequency in response to detected temperature can readily be achieved by microcomputer 6.

Figure 15:
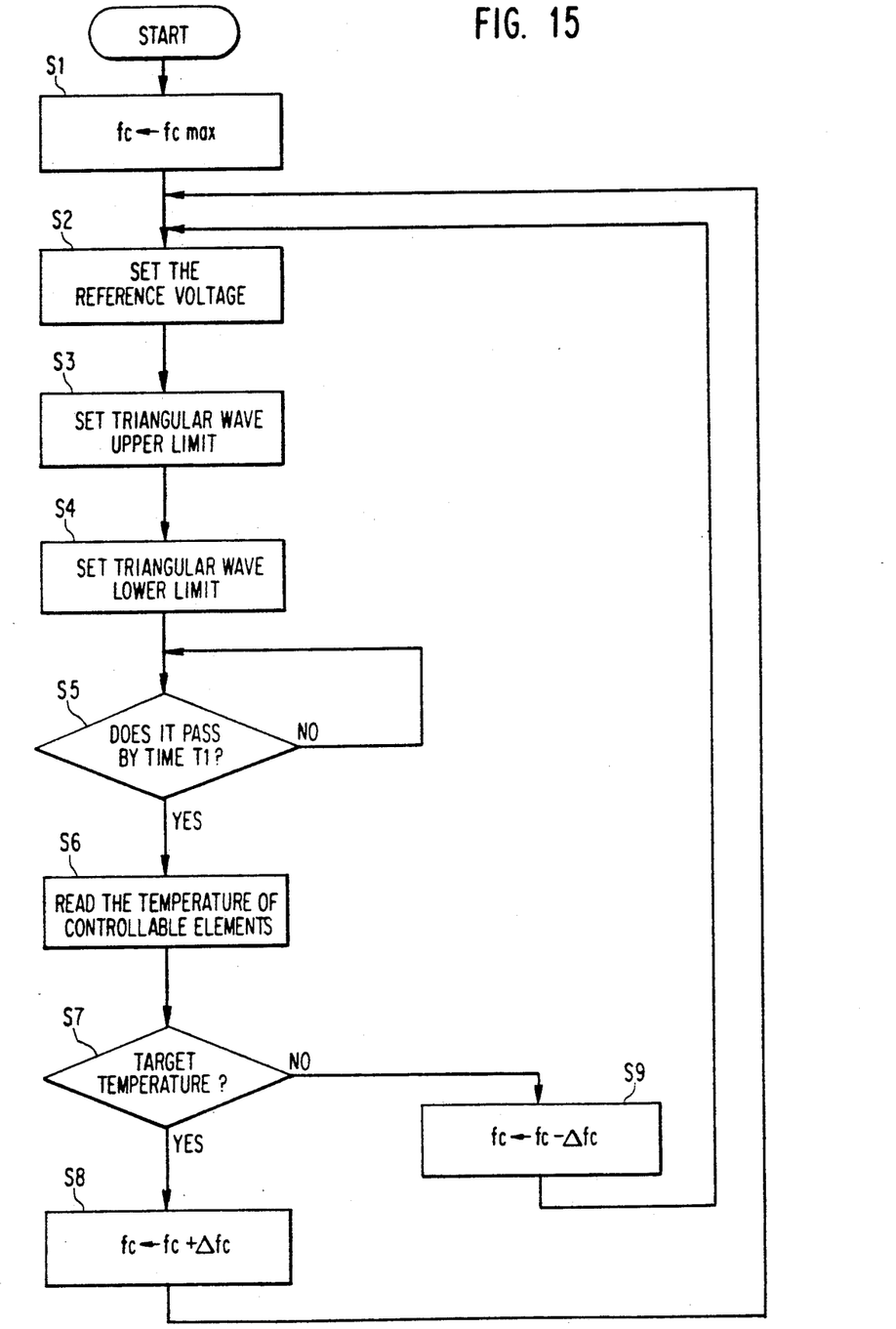
FIG. 15 is a flow chart illustrating the algorithm used for changing the carrier frequency on the basis of temperature.

FIG. 15 schematically shows the flow of the process for changing the carrier frequency $f_c$ upon detection of the element temperature $T_O$ as performed by the microcomputer 6.

The step START represents that the operation of the inverter is started. Considering that the element temperature $T_O$ is still low, $f_c$max is set as the carrier frequency $f_c$ in Step S1. Taking into account the carrier frequency $f_c$max, setting of the reference voltage, setting of the upper limit value of the triangular wave and the setting of the lower limit value are executed in Steps S2 to S4.

In Step S5, a time process is performed by a timer in which a time $t_1$ has been set. The time $t_1$ is determined on the basis of the thermal time constant of the controllable element including the cooling means of the controllable element. After elapse of the time $t_1$, the element temperature $T_O$ is read in Step S6. In Step S7, the element temperature $T_O$ is compared with the command temperature T. The command temperature T is a value obtained from the thermal design of the controllable element. In general, the command temperature T is set at a level which is obtained by de-rating the allowable maximum temperature $T_R$ to some extent. When the detected element temperature $T_O$ is lower than the command temperature T, the carrier frequency $f_c$ is set in Step S8 to a level which is higher than the instant carrier frequency $f_c$ by $\Delta f_c$.

Then, Steps S2 to S4 are executed again on the basis of the carrier frequency $f_c$ set in Step S8 or S9, and this operation is conducted repeatedly.

If the carrier frequency $f_c$ has already been set to $f_c$max, Step S8 allows the operation of the inverter to continue by setting the frequency increment $\Delta f_c$ to zero, i.e., maintaining the carrier frequency $f_c$ constantly at the level of the $f_c$max.

When the previously set carrier frequency $f_c$ is $f_c$min in Step S9, the microcomputer judges that an abnormal temperature rise of the element is taking place, and skips to a protection process routine.

Figure 16:
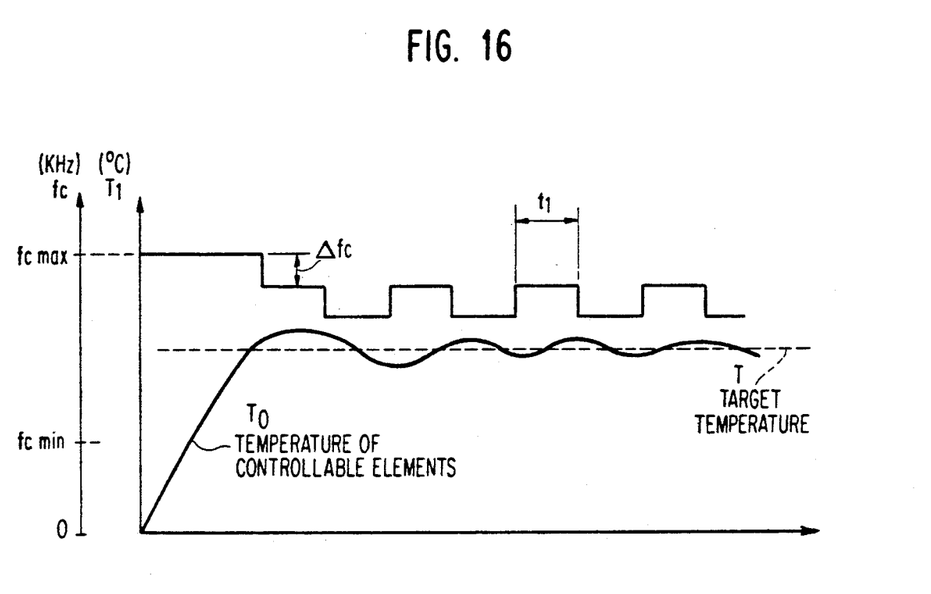
FIG. 16 illustrates the variation of frequency and temperature with time.

FIG. 16 quantitatively shows the manner in which the carrier frequency $f_c$ and the element temperature $T_O$ are changed in relation to the time t as a result of execution of the process described hereinabove.

The described embodiment may be modified such that a tolerance $\Delta T$ is imparted to the command temperature T so as to give a hysteresis effect to the control of the carrier frequency $f_c$. It is also possible to compute the variance of the detected element temperature $T_O$ and to vary the carrier frequency increment $\Delta f_c$ in accordance with the variance of the element temperature.

Figure 17:
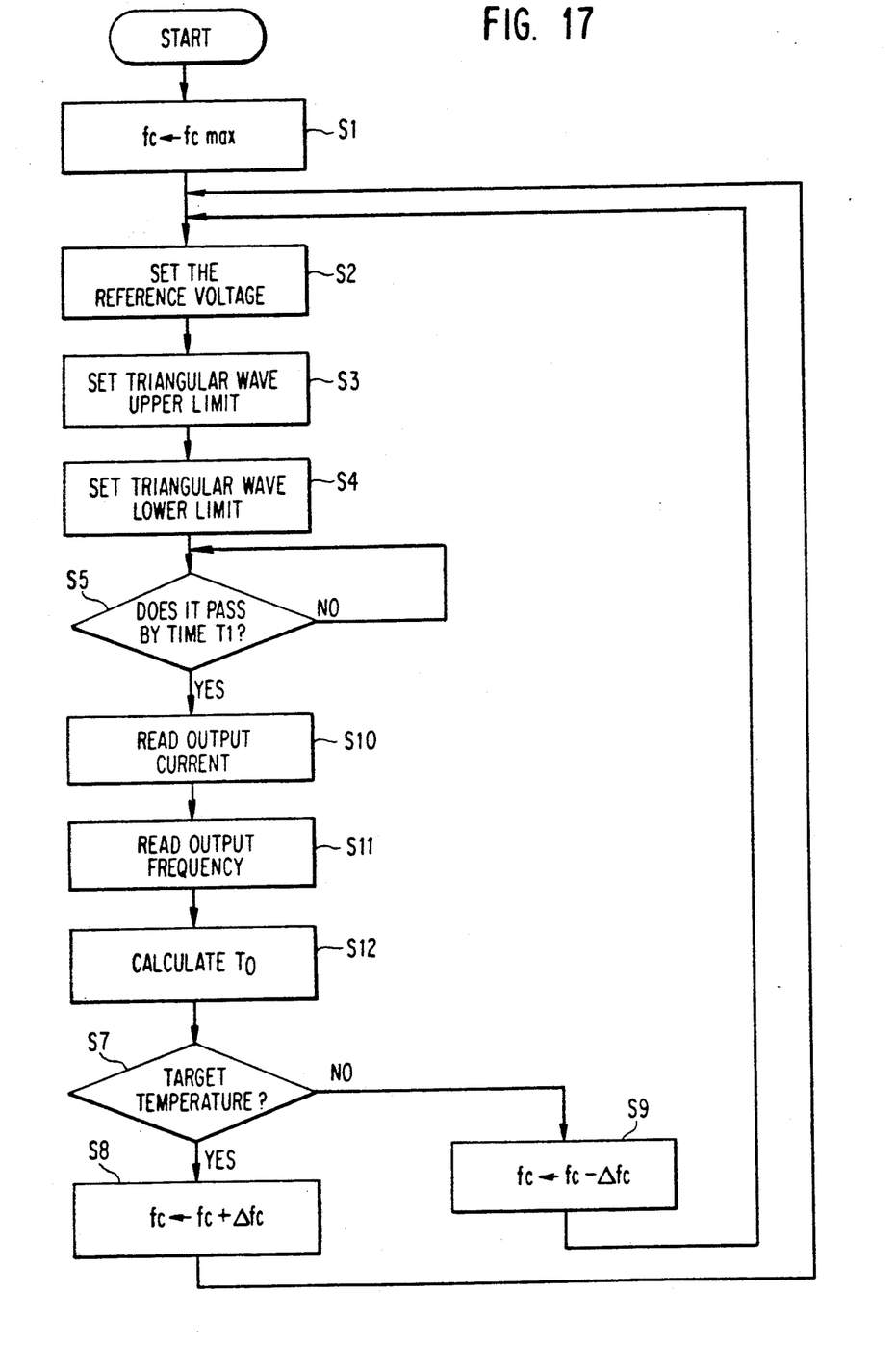
FIG. 17 is a flow chart illustrating the algorithm used for changing the carrier frequency on the basis of output current.

FIG. 17 schematically shows the flow of the process performed by the microcomputer 6 for changing the carrier frequency $f_c$ on the basis of the output current $I_o$ and the output frequency $f_o$. The process is materially the same as that shown in FIG. 15 except that $T_o$ is computed from the detected values $I_O$ and $f_o$ of the output current and the output frequency instead of being detected directly.

While the present invention has been disclosed in connection with several embodiments, it is not intended to be limited thereto and the full scope of protection to which the invention is entitled is defined in the appended claims.

What is claimed is:

1. A pulse-width modulation-type inverter, comprising:
   an inversion converter comprising a controllable element for converting a D.C. current into an A.C. current of variable output voltage and output frequency;
   a reference voltage generating means operative to output a reference voltage waveform for use as a reference for said output frequency and output voltage;
   carrier generating means for forming and outputting a carrier waveform at a carrier frequency;
   a pulse width modulation circuit for comparing said reference voltage and said carrier and for generating a signal to control said controllable element of said inversion converter;
   driving means for driving said controllable element in response to a signal from said pulse width modulation circuit; and
   control means responsive to a detected operational parameter for controlling said carrier frequency within a predetermined range, said operational parameter comprising the load current of said inverter and said control means operating to increase said carrier frequency in accordance with a decrease in said load current and decrease said carrier frequency in accordance with an increase in said load current.

2. The inverter of claim 1, further comprising:

current detection means for detecting the load current of said inverter when said carrier frequency is within a predetermined range.

3. A pulse-width modulation-type inverter comprising:

an inversion converter comprising a controllable element for converting a D.C. current into an A.C. current of variable voltage and frequency;

reference voltage generating means operative to output a reference voltage waveform for use as a reference for the output frequency and output voltage;

carrier generating means for forming and outputting a carrier waveform at a carrier frequency;

a pulse width modulation circuit for comparing and modulating said reference voltage and said carrier and for generating a signal to control said controllable element of said inversion converter;

driving means for driving said controllable element in response to a signal from said pulse width modulation circuit;

control means for performing, within a predetermined range of carrier frequency, a control function such as to increase said carrier frequency in accordance with a decrease in the temperature of said controllable element and to decrease said carrier frequency in accordance with an increase in the temperature of said controllable element.

4. The inverter of claim 3 further comprising temperature detection means for detecting the temperature of said inversion converter.

5. The inverter of claim 4 wherein said reference voltage waveform comprises a sine wave and said carrier waveform approximates a triangular wave.

* * * * *